United States Patent
Kimura

[11] Patent Number: 6,088,158
[45] Date of Patent: Jul. 11, 2000

[54] REAR PROJECTION SCREEN HAVING RESISTANCE TO CHANGE OF EXTERNAL HUMIDITY

[75] Inventor: Makoto Kimura, Tokyo-To, Japan

[73] Assignee: Dai Nippon Printing Co., Ltd., Japan

[21] Appl. No.: 09/140,339

[22] Filed: Aug. 26, 1998

[30] Foreign Application Priority Data

Aug. 29, 1997 [JP] Japan .................................. 9-233970

[51] Int. Cl.[7] ............................ G03B 21/56; G03B 21/60
[52] U.S. Cl. ...................... 359/443; 359/451; 359/455; 359/457
[58] Field of Search .................................. 359/443, 455, 359/456, 457, 460, 451; 264/1.7

[56] References Cited

U.S. PATENT DOCUMENTS

| | | | |
|---|---|---|---|
| 4,730,897 | 3/1988 | Mckechnie et al. | 350/128 |
| 4,868,261 | 9/1989 | Kobayashi et al. | 526/262 |
| 4,910,291 | 3/1990 | Yamamoto et al. | 528/272 |
| 4,961,642 | 10/1990 | Ogino | 353/38 |
| 5,337,179 | 8/1994 | Hodges | 359/443 |
| 5,745,288 | 4/1998 | Miyata et al. | 359/457 |

*Primary Examiner*—Safet Metjahic
*Assistant Examiner*—Christopher Mahoney
*Attorney, Agent, or Firm*—Parkhurst & Wendel, L.L.P.

[57] ABSTRACT

A rear projection screen free from lowering of resolution which is caused when the screen set undergoes separation or undesirably warps due to a change in the external humidity. The rear projection screen is composed of a plurality of sheets, a front surface sheet 13, a lenticular lens sheet 11 and a Fresnel lens sheet 12. The front surface sheet 13 and the Fresnel lens sheet 12 are respectively composed of two layers, an inner layer 13a, 12a and an outer layer 13b, 12b. The inner layer 13a, 12a is made from a material having susceptibility to water higher than that of a material from which the outer layer 13b, 12b is made.

8 Claims, 4 Drawing Sheets

REAR PROJECTION SCREEN HAVING RESISTANCE TO CHANGE OF EXTERNAL HUMIDITY

BACKGROUND OF THE INVENTION

1. Field of the Invention

The present invention relates to rear projection screens useful for projector TVs.

2. Related Art

FIGS. 6A and 6B are views showing one example of projector TVs, in which a conventional rear projection screen is employed.

A conventional rear projection screen 60 is composed of a lenticular lens sheet 61 positioned on the observation side of the screen, and a Fresnel lens sheet 62 positioned on the projection side of the screen, and imaging light is projected by a projector (light source) 70 from the rear of the screen.

The above-described conventional rear projection screen has such a problem that the screen set undergoes separation or undesirably warps due to a change in the external humidity, resulting in lowering of resolution.

Specifically, in the case where the screen set absorbs moisture and expands when the external humidity is increased, the two sheets constituting the screen set warp so that they are separated from each other as shown in FIG. 6B. As a result, separation is caused in the screen set.

Thereafter, the moisture penetrates from the screen surface into the inner part of the screen set, and the screen set returns to its original shape. However, it takes many hours for this recovery.

An object of the present invention is to provide a rear projection screen free from lowering of resolution which is caused when the screen set undergoes separation or undesirably warps due to a change in the external humidity.

SUMMARY OF THE INVENTION

A first aspect of the present invention is a rear projection screen comprising at least one of a front surface sheet, a lenticular lens sheet and a Fresnel lens sheet, wherein at least one of the front surface sheet, the lenticular lens sheet and the Fresnel lens sheet is composed of multiple layers made from materials which are different in susceptibility to water.

A second aspect of the present invention is a rear projection screen comprising at least two of a front surface sheet, a lenticular lens sheet and a Fresnel lens sheet in combination, wherein at least one of the front surface sheet, the lenticular lens sheet and the Fresnel lens sheet which is positioned on the projection or observation side of the screen is composed of multiple layers including an inner layer and an outer layer, the inner layer being made from a material having susceptibility to water higher than that of a material from which the outer layer is made.

A third aspect of the present invention is a rear projection screen comprising a lenticular lens sheet and a Fresnel lens sheet in combination, wherein at least one of the lenticular lens sheet and the Fresnel lens sheet is composed of multiple layers including an inner layer and an outer layer, the inner layer being made from a material having susceptibility to water higher than that of a material from which the outer layer is made, and the lenticular lens sheet and the Fresnel lens sheet are in a shape which is convex relative to the projection side of the screen.

A fourth aspect of the present invention is a rear projection screen comprising a lenticular lens sheet and a Fresnel lens sheet in combination, wherein at least one of the lenticular lens sheet and the Fresnel lens sheet is composed of multiple layers including an inner layer and an outer layer, the inner layer being made from a material having susceptibility to water higher than that of a material from which the outer layer is made, and the lenticular lens sheet and the Fresnel lens sheet are in a shape which is convex relative to the observation side of the screen.

A fifth aspect of the present invention is a rear projection screen comprising a front surface sheet, a lenticular lens sheet and a Fresnel lens sheet provided in the mentioned order, wherein at least one of the front surface sheet and the Fresnel lens sheet is composed of multiple layers including an inner layer and an outer layer, the inner layer being made from a material having susceptibility to water higher than that of a material from which the outer layer is made, and the front surface sheet, the lenticular lens sheet and the Fresnel lens sheet are in a shape which is convex relative to the projection side of the screen.

A sixth aspect of the present invention is a rear projection screen comprising a front surface sheet, a lenticular lens sheet and a Fresnel lens sheet provided in the mentioned order, wherein at least one of the front surface sheet and the Fresnel lens sheet is composed of multiple layers including an inner layer and an outer layer, the inner layer being made from a material having susceptibility to water higher than that of a material from which the outer layer is made, and the front surface sheet, the lenticular lens sheet and the Fresnel lens sheet are in a shape which is convex relative to the observation side of the screen.

In the above-described second to sixth aspects of the invention, it is preferable that the multiple layers further include an intermediate layer between the inner layer and the outer layer, wherein the intermediate layer is made from a material having susceptibility to water higher than that of the material from which the outer layer is made, and, at the same time, lower than that of the material from which the inner layer is made.

According to the present invention, since a sheet composed of multiple layers including an inner layer and an outer layer which are made from materials different in susceptibility to water is used to obtain a rear projection screen, it is possible to prevent the lowering of resolution which is caused when the screen set undergoes separation or undesirably warps due to a change in the external humidity.

DETAILED DESCRIPTION OF THE INVENTION

Figure 1A:
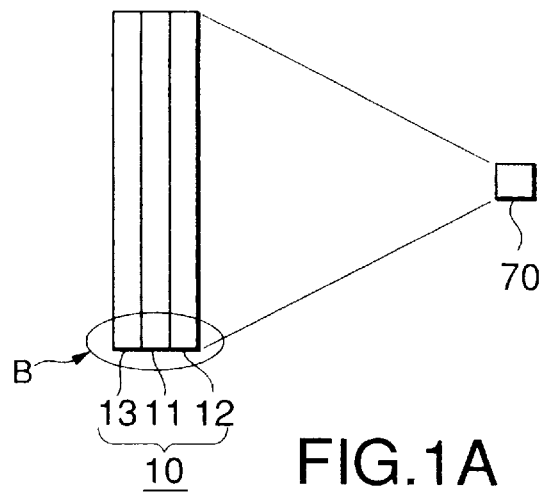
FIGS. 1A, 1B and 1C are views showing a first embodiment of the rear projection screen according to the present invention.

By referring now to the accompanying drawings, embodiments of the present invention will be described specifically.
First Embodiment FIGS. 1A, 1B and 1C are views showing a first embodiment of the rear projection screen according to the present invention.

A rear projection screen 10 of the first embodiment is composed of a lenticular lens sheet 11, a Fresnel lens sheet 12 which is provided on the projection side relative to the lenticular lens sheet 11, and a front surface sheet 13 which is provided on the observation side relative to the lenticular lens sheet 11.

Among the lenticular lens sheet 11, the Fresnel lens sheet 12 and the front surface sheet 13, a sheet which is provided on the outer surface of the screen (the outer surface on the observation and/or projection side) contains an inner layer and an outer layer which are made from materials different in susceptibility to water.

Figure 1B:
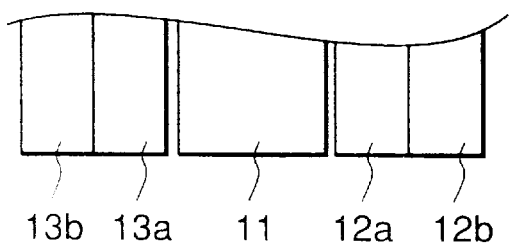
Figure 1C:
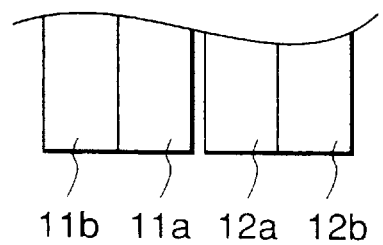

For example, in the case where the screen is composed of three sheets, the lenticular lens sheet 11, the front surface sheet 13 and the Fresnel lens sheet 12, the lenticular lens sheet 11 being positioned between the front surface sheet 13 and the Fresnel lens sheet 12 as shown in FIG. 1B, the front surface sheet 13 is composed of two layers of an inner layer 13a and an outer layer 13b, the inner layer 13a being made from a material having susceptibility to water higher than that of a material from which the outer layer 13b is made, and the Fresnel lens sheet 12 is composed of two layers of an inner layer 12a and an outer layer 12b, the inner layer 12a being made from a material having susceptibility to water higher than that of a material from which the outer layer 12b is made. In this case, the lenticular lens sheet 11, which is provided at the center of the screen, is not necessary to have a multi-layer structure.

Further, in the case where the screen is composed of two sheets, the lenticular lens sheet 11 and the Fresnel lens sheet 12, as shown in FIG. 1C, the lenticular lens sheet 11 is composed of two layers of an inner layer 11a and an outer layer 11b, the inner layer 11a being made from a material having susceptibility to water higher than that of a material from which the outer layer is made, and the Fresnel lens sheet 12 is composed of two layers of an inner layer 12a and an outer layer 12b, the inner layer 12a being made from a material having susceptibility to water higher than that of a material from which the outer layer 12b is made.

In this embodiment, since those materials which are different in susceptibility to water are used for the inner and outer layers of sheets which constitute a screen, it is possible to control the warpage of each sheet which is caused due to a change in humidity. The term "susceptibility to water" as used herein means at least one of those properties which are rate of water absorption, coefficient of water absorption expansion, and water absorption.

In this case, since materials having high water absorption are used for the inner layers of sheets which constitute a screen, the screen can restore its original condition in a short time due to a small amount of penetrating water.

Further, when the external humidity is decreased, moisture is released from the outer layers of the sheets which constitute the screen, and the sheets shrink. Warpage is thus caused in the direction in which the multiple sheets push each other, and, due to the ill-balanced forces, warpage in the undesirable direction can be caused in the rear projection screen.

Also in this case, since a material having high coefficient of water absorption expansion is used at the inner part of the rear projection screen, the warpage in the direction in which the sheets push each other is reduced in a short time, and the screen can easily restore its original shape at the time of the stable condition.

In particular, the present invention is remarkably effective for large-size screens such as screens of approximately 60 inches or more.

Figure 2A:
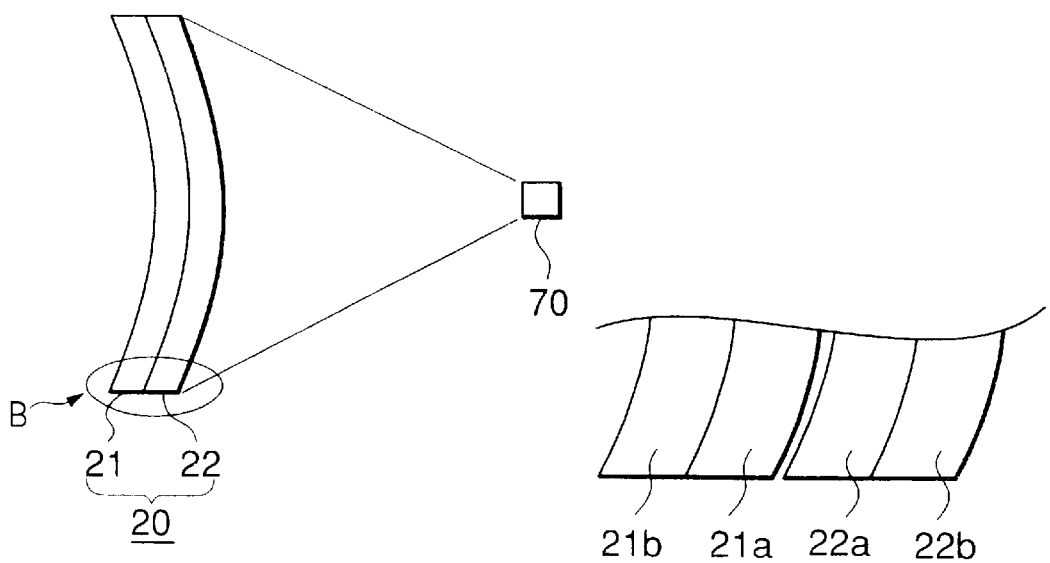
FIGS. 2A and 2B are views showing a second embodiment of the rear projection screen according to the present invention.
Figure 2B:
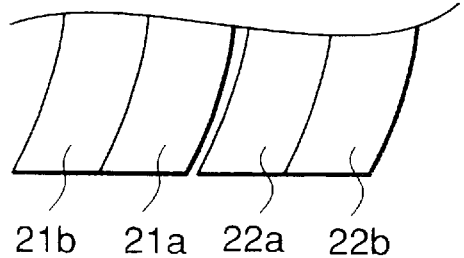

Examples of materials which are different in water absorption include acrylic resins (water absorption: 0.3 to 0.4%), polycarbonate (water absorption: 0.15%), and styrol (water absorption: 0.03 to 0.1%). It is noted that the above water absorptions are obtained by the testing method of JIS (Japanise Industrial Standard) K 7209, in which a test piece having a thickness of 3.18 mm is tested for 24 hours. The desired effects can filly be obtained when the difference between the water absorptions is at least approximately 0.1%, and, moreover, no problem occurs even if the difference becomes large.
Second Embodiment FIGS. 2A and 2B are views showing a second embodiment of the rear projection screen according to the present invention.

In the following embodiments, those parts which have the same functions as in the first embodiment are indicated by the identical reference numerals, and descriptions of such parts may be omitted.

In the second embodiment, a lenticular lens sheet 21 and a Fresnel lens sheet 22 are respectively composed of two layers, an inner layer 21a, 22a and an outer layer 21b, 22b, wherein the inner layer 21a, 22a is made from a material having susceptibility to water higher than that of a material from which the outer layer 21b, 22b is made.

Further, both the lenticular lens sheet 21 and the Fresnel lens sheet 22 are so shaped that they are convex relative to the projection side of the screen.

The purpose of making the two lens sheets convex relative to the projection side of the screen is to surely prevent separation under the normal conditions by allowing the lenticular lens sheet 21 to push the Fresnel lens sheet 22 having higher rigidity. In this case, in order to stabilize the entire screen, the Fresnel lens sheet 22 is also made convex.

Figure 3A:
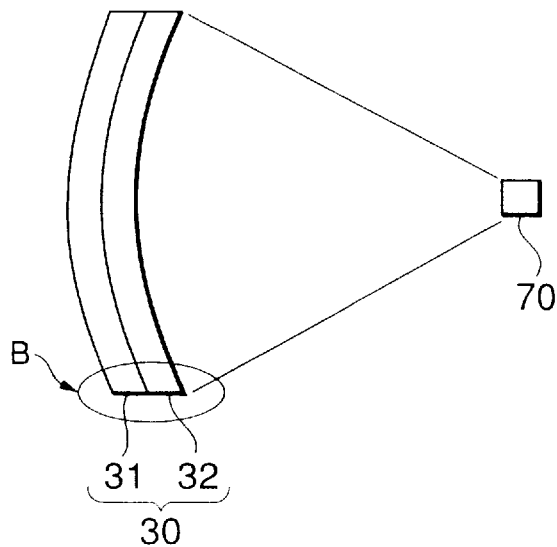
FIGS. 3A and 3B are views showing a third embodiment of the rear projection screen according to the present invention.
Figure 3B:
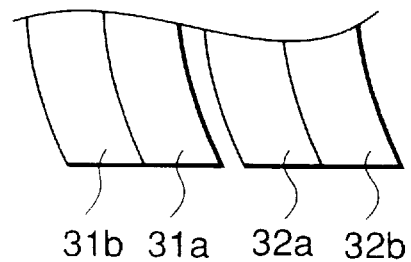

Therefore, in the second embodiment, adhesion between the lenticular lens sheet 21 and the Fresnel lens sheet 22 is excellent, and the two lens sheets show high stability when they absorb or release water.
Third Embodiment FIGS. 3A and 3B are views showing a third embodiment of the rear projection screen according to the present invention.

In the third embodiment, as in the second embodiment, a lenticular lens sheet 31 and a Fresnel lens sheet 32 are respectively composed of two layers, an inner layer 31a, 32a and an outer layer 31b, 32b, wherein the inner layer 31a, 32a is made from a material having susceptibility to water higher than that of a material from which the outer layer 31b, 32b is made.

However, the screen of this embodiment is different from that of the second embodiment in that the lenticular lens sheet 31 and the Fresnel lens sheet 32 are shaped to be convex relative to the observation side of the screen.

In the case of an LCD or DMD projector which is considered to have a single light source, it is possible to make the lenticular lens sheet thick, thereby imparting thereto rigidity. Therefore, the third embodiment is suitable for preventing separation by allowing the Fresnel lens sheet which has been made thin in order to prevent the formation of dual images to push the lenticular lens sheet which has been made thick.

Fourth Embodiment

Figure 4A:
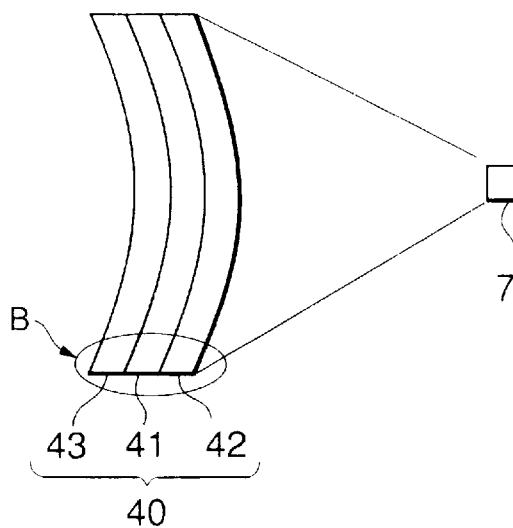
FIGS. 4A and 4B are views showing a fourth embodiment of the rear projection screen according to the present invention.
Figure 4B:
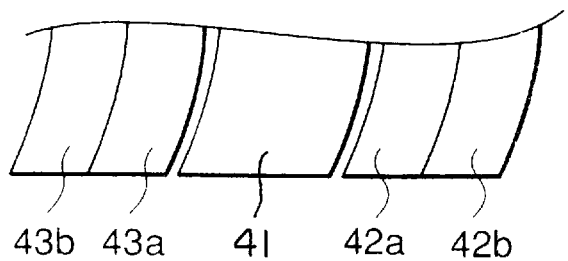

FIGS. 4A and 4B are views showing a fourth embodiment of the rear projection screen according to the present invention.

Like the first embodiment, the fourth embodiment is a screen set composed of three sheets, a front surface sheet 43, a lenticular lens sheet 41 and a Fresnel lens sheet 42, the lenticular lens sheet 41 being positioned between the front surface sheet 43 and the Fresnel lens sheet 42, wherein the front surface sheet 43 and the Fresnel lens sheet 42 are respectively composed of two layers of an inner layer 43a, 42a and an outer layer 43b, 42b, the inner layer 43a, 42a being made from a material having susceptibility to water higher than that of a material from which the outer layer 43b, 42b is made.

Further, the front surface sheet 43, the lenticular lens sheet 41 and the Fresnel lens sheet 42 are in a shape which is convex relative to the projection side of the screen.

It is also possible to make these three sheets convex relative to the observation side of the screen although such a screen is not shown in a figure.

Fifth Embodiment

Figure 5:
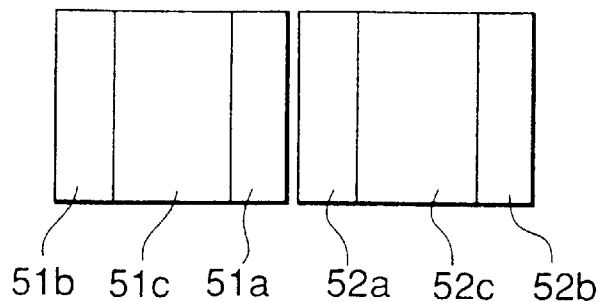
FIG. 5 is a view showing a sixth embodiment of the rear projection screen according to the present invention.
Figure 6A:
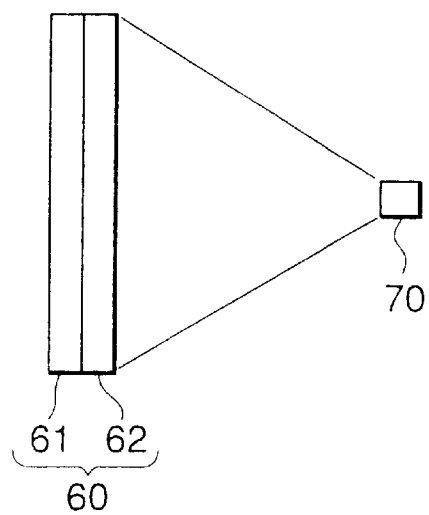
FIGS. 6A and 6B are views showing a projector TV in which a conventional rear projection screen is employed.
Figure 6B:
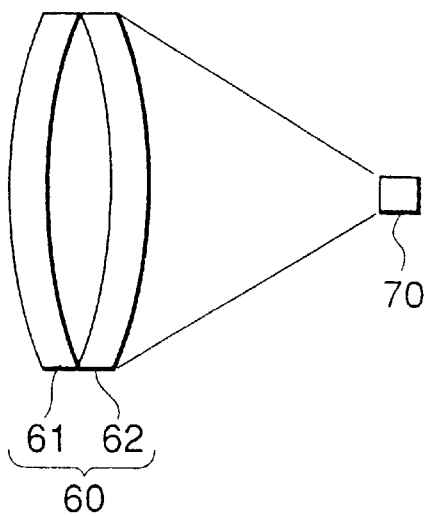

FIG. 5 is a view showing a fifth embodiment of the rear projection screen according to the present invention.

The fifth embodiment is a screen set composed of two sheets, a lenticular lens sheet 51 and a Fresnel lens sheet 52, wherein the two sheets are respectively composed of three layers, an inner layer 51a, 52a, an intermediate layer 51c, 52c and an outer layer 51b, 52b, the intermediate layer 51c, 52c being provided between the inner layer 51a, 52a and the outer layer 51b, 52b.

Also in this case, the inner layer 51a, 52a is made from a material having susceptibility to water higher than that of a material from which the outer layer 51b, 52b is made.

Even in the three-layer (multi-layer) structure, if the water absorption increases toward the inside of the screen, moisture is absorbed and released through layers which are thinner than those in the case of the two-layer structure, so that the desired effects can be obtained rapidly.

The above-described embodiments can be changed or modified variously without being limited by the above description, and such variant/modified embodiments are also within the equivalent of the present invention. For instance, only one sheet which is positioned at the outermost of a screen, either on the observation side or on the projection side can have a structure in which an inner layer is made from a material having susceptibility to water higher than that of a material from which an outer layer is made.

EXAMPLE

The present invention will now be explained more specifically by referring to the following Example.

In this Example, a lenticular lens sheet composed of two layers, an inner layer and an outer layer, produced by means of coextrusion, using polymethyl methacrylate (PMMA) and styrene copolymer resin having a water absorption of 0.2% for the outer layer, and PMMA resin having a water absorption of 0.3% for the inner layer was combined with a Fresnel lens sheet made mainly from PMMA resin to obtain a rear projection screen according to the present invention. On the other hand, in Comparative Example (Conventional Example), a lenticular lens sheet whose inner and outer layers were made from PMMA and strene copolymer resin having a water absorption of 0.2% was combined with the same Fresnel lens sheet as the one used in Example to obtain a comparative/conventional rear projection screen. The rear projection screen according to the present invention and the comparative one thus obtained were subjected to a comparative test.

Figure 7:
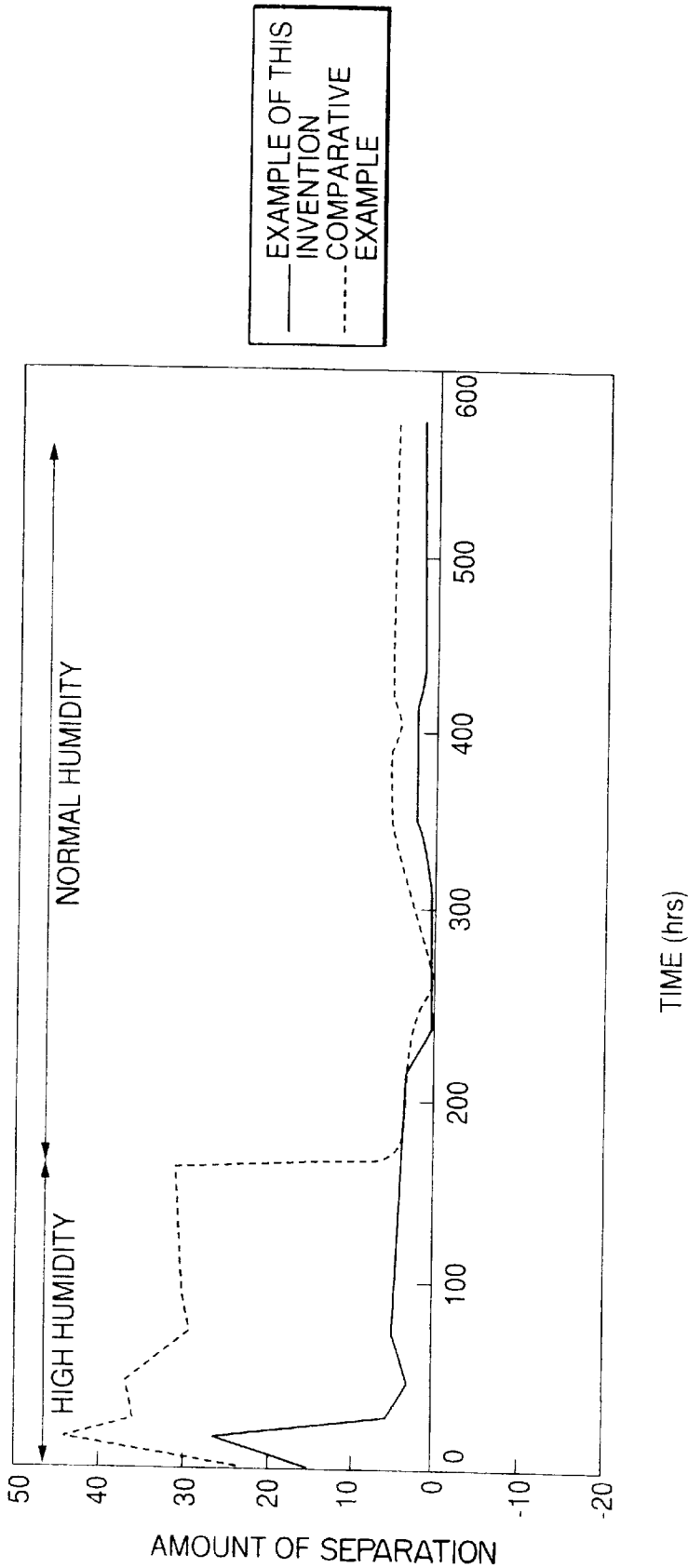
FIGS. 7 is a graph showing the results of a moistening test, in which separation caused in a rear projection screen of the present invention prepared in Example was compared with separation caused in a conventional rear projection screen prepared in Conventional Example.

The test was carried out in the following manner: the two screens were allowed to stand in a highly humid (95% RH) atmosphere for 160 hours, and then under the normal condition (43% RH); and a change in separation caused in each screen was observed (see FIG. 7). It is noted that an amount of separation in FIG. 7 corresponds to a distance of the gap in millimeters (mm) between the lenticular lens sheet and the Fresnel lens sheet, and that the distance of the gap is measured as a displacement of the surface on the observation side of the lenticular lens sheet when the center of the lenticular lens sheet is pushed toward the Fresnel lens sheet.

As a result, it was confirmed that the rear projection screen according to the present invention showed only a little separation during the preservation under both the highly humid condition and the normal condition and that it was easy for the screen of the invention to maintain the condition desirable as a screen.

What is claimed is:

1. A rear projection screen comprising at least one of a front surface sheet, a lenticular lens sheet and a Fresnel lens sheet, wherein at least one of the front surface sheet, the lenticular lens sheet and the Fresnel lens sheet is composed of multiple layers made from materials which are different in susceptibility to water.

2. A rear projection screen comprising at least two of a front surface sheet, a lenticular lens sheet and a Fresnel lens sheet in combination, wherein at least one of the front surface sheet, the lenticular lens sheet and the Fresnel lens sheet which is positioned at the projection or observation side of the screen is composed of multiple layers including an inner layer and an outer layer, the inner layer being made from a material having susceptibility to water higher than that of a material from which the outer layer is made.

3. The rear projection screen according to claim 2, wherein the multiple layers further include an intermediate layer between the inner layer and the outer layer, the intermediate layer being made from a material having susceptibility to water higher than that of the material from which the outer layer is made, and, at the same time, lower than that of the material from which the inner layer is made.

4. A rear projection screen comprising a lenticular lens sheet and a Fresnel lens sheet in combination, wherein at least one of the lenticular lens sheet and the Fresnel lens sheet is composed of multiple layers including an inner layer and an outer layer, the inner layer being made from a material having susceptibility to water higher than that of a material from which the outer layer is made, and the lenticular lens sheet and the Fresnel lens sheet are in a shape which is convex relative to the projection side of the screen.

5. The rear projection screen according to claim 4, wherein the multiple layers further include an intermediate layer between the inner layer and the outer layer, the intermediate layer being made from a material having susceptibility to water higher than that of the material from which the outer layer is made, and, at the same time, lower than that of the material from which the inner layer is made.

6. A rear projection screen comprising a lenticular lens sheet and a Fresnel lens sheet in combination, wherein at least one of the lenticular lens sheet and the Fresnel lens sheet is composed of multiple layers including an inner layer and an outer layer, the inner layer being made from a material having susceptibility to water higher than that of a material from which the outer layer is made, and the lenticular lens sheet and the Fresnel lens sheet are in a shape which is convex relative to the observation side of the screen.

7. A rear projection screen comprising a front surface sheet, a lenticular lens sheet and a Fresnel lens sheet provided in the mentioned order, wherein at least one of the front surface sheet and the Fresnel lens sheet is composed of multiple layers including an inner layer and an outer layer, the inner layer being made from a material having susceptibility to water higher than that of a material from which the outer layer is made, and the front surface sheet, the lenticular lens sheet and the Fresnel lens sheet are in a shape which is convex relative to the projection side of the screen.

8. A rear projection screen comprising a front surface sheet, a lenticular lens sheet and a Fresnel lens sheet provided in the mentioned order, wherein at least one of the front surface sheet and the Fresnel lens sheet is composed of multiple layers including an inner layer and an outer layer, the inner layer being made from a material having susceptibility to water higher than that of a material from which the outer layer is made, and the front surface sheet, the lenticular lens sheet and the Fresnel lens sheet are in a shape which is convex relative to the observation side of the screen.

* * * * *